(No Model.)
C. WOOLNOUGH.
TRACE FASTENING BOLT.
No. 253,147. Patented Jan. 31, 1882.
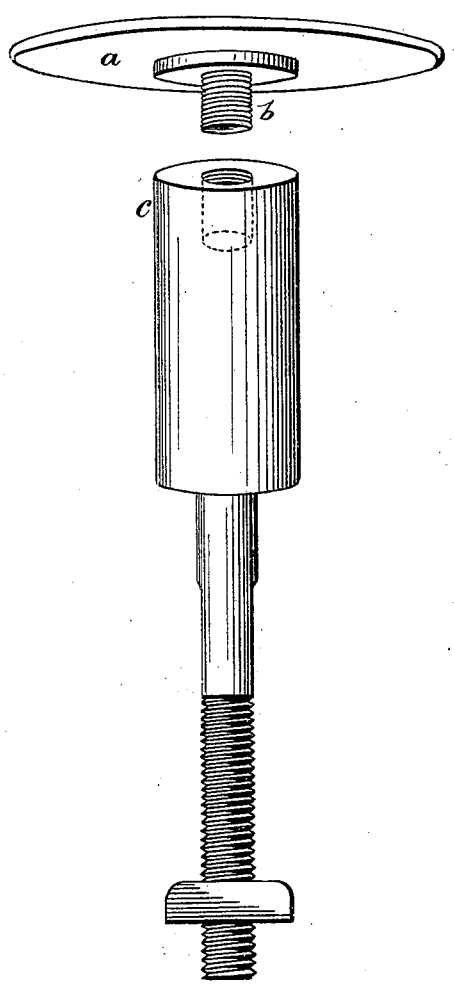
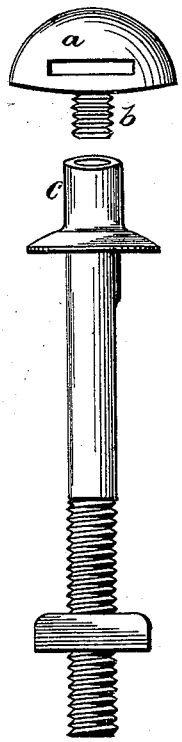
Witnesses.
Robert Errett
Edward G. Siggers
Inventor:
Cornelius Woolnough
By W. H. Babcock
Atty

UNITED STATES PATENT OFFICE.

CORNELIUS WOOLNOUGH, OF NO. 2 ELIZABETH STREET, EATON SQUARE, COUNTY OF MIDDLESEX, ENGLAND.

TRACE-FASTENING BOLT.

SPECIFICATION forming part of Letters Patent No. 253,147, dated January 31, 1882.

Application filed September 29, 1881. (No model.) Patented in England March 9, 1880, in France August 21, 1880, and in Belgium September 15, 1880.

*To all whom it may concern:*

Be it known that I, CORNELIUS WOOLNOUGH, a subject of the Queen of Great Britain, residing at No. 2 Elizabeth Street, Eaton Square, in the county of Middlesex, England, coach-builder, have invented a new and useful Improvement in Carriage-Bolts, (for which I have obtained a patent in Great Britain, No. 1,021, bearing date 9th March, 1880; also, a patent in France, No. 138,368, bearing date 21st August, 1880; also, a patent in Belgium, No. 52,389, bearing date 15th September, 1880,) of which the following is a specification.

Heretofore the bolts technically termed "roller-bolts" and "dragon-tongue bolts," with which carriages and other vehicles are fitted for attaching the traces thereto, have either had the head and shank formed continuous or so fitted together as to be immovable, while owing to the nut which takes onto the threaded end of the shank being screwed up extremely tight, it is impossible in case of accident to readily unscrew the same in order to liberate the horse or horses attached to the vehicle, thus frequently involving not only considerable damage thereto, but also serious injury to its occupants.

Now the object of my invention is to obviate this disadvantage and to afford a ready means for almost instantaneously releasing the horse or horses from a carriage or other vehicle.

The principle of my invention consists in making the head and shank of a carriage roller-bolt or dragon-tongue bolt easily detachable from each other. One method of carrying out such principle is as follows, videlicet: The head and shank of the bolt are made separate from each other, while the head of the bolt is provided with a suitable plug having a screw-thread formed thereon. Such plug takes into a central socket of any convenient dimensions formed in the upper portion of the shank of the bolt and provided with a female thread. When the head and shank of a bolt so made are screwed together the bolt is in every way as strong and effective as if such head and shank were united together as hitherto, while when necessity arises the head of the bolt can be readily detached by unscrewing the same, which thus allows of the trace being instantaneously released therefrom.

Figure 1 of the accompanying drawings shows a carriage roller-bolt constructed in the manner above described, while Fig. 2 shows a dragon-tongue bolt constructed on a similar principle.

$a$ is the head of the bolt with screw-plug $b$, and $c$ the socket in the shank to receive same.

One great advantage of such improved construction of carriage-bolt is that it does not necessitate the slightest alteration in the harness, at the same time that it can be applied with equal facility to any carriage or vehicle, and is suitable for either one or more horses. I wish it, however, to be distinctly understood that I do not confine myself to the precise method of carrying out the principle of my invention hereinbefore specified and illustrated, as the same will admit of various modifications without departing from such principle.

The bolt is applied to a vehicle by passing the threaded end down through a hole in the cross-bar of the shafts or through an attachment to the front of the wagon. The hole or cockeye of the trace is then placed over the upper end of the main part of the bolt, and the cap part of the bolt is screwed home, so as to clamp the trace against the main part of the bolt. When the main part of the bolt has a threaded upward extension, as shown in Fig. 2, the same extends up through the cockeye. When the bolt is constructed as in Fig. 1 the cockeye similarly receives the downward extension of the cap. By unscrewing the cap in either case the trace is left free to be easily removed. The same construction of bolt and the same method of fastening are used with each trace.

What I claim as my invention is—

A carriage roller-bolt or dragon-tongue bolt having a movable head capable of being easily detached from the shank, so as to allow of the trace being readily slipped off the same and of the horse or horses being almost instantaneously liberated from a carriage, wagon, or other vehicle in case of accident.

CORNELIUS WOOLNOUGH.

Witnesses:
SHIRLEY BOWDEN,
F. BOWDEN.